UNITED STATES PATENT OFFICE 2,498,875

COLORING CELLULOSIC MATERIALS WITH DIAZONIUM SALTS AND NAPHTHYL ETHERS

Louis H. Bock, Huntingdon Valley, and Peter L. de Benneville, Philadelphia, Pa., assignors to Röhm & Haas Company, Philadelphia, Pa., a corporation of Delaware No Drawing. Application August 19, 1947, Serial No. 769,532

4 Claims. (Cl. 8—1)

This invention concerns a novel process for the fixation of color bodies or color-imparting groups on cellulosic fibers or other cellulosic materials. More particularly, this invention deals with coupling a diazonium compound with a naphthyl group having an ether group in the beta-position thereof and binding the naphthyl ether group to cellulose through a methylene linkage obtained from a quaternary ammonium methyl group carried by the naphthyl nucleus.

As a diazonium compound, there may be used one or more of the diazonium compounds obtained from aromatic amines, such as aniline, chloroanilines, bromoanilines, nitroanilines, cyanoanilines, alkoxyanilines, C-alkylanilines, bromonitroanilines, bromo-C-alkylanilines, anthranilic esters, aminophthalic esters, aminobiphenyls, napthylamines, aminosulfonic acids, arylpolyamines, such as benzidine, phenylenediamine, dianisidine, diaminobiphenyls, and the like. These amines yield diazonium salts of the formula

where X is an anion such as chlorine, bromine, nitrate, sulfate, etc., and $n$ is a small integer such as one or two.

The naphthyl ethers having a quaternary ammonium methyl group as a substituent of the cycles have the formula

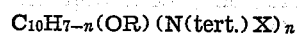

or

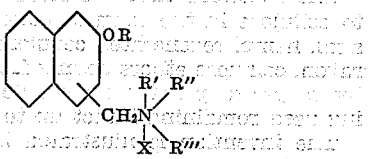

wherein R is an alkyl group of one to eighteen carbon atoms; R', taken individually, is a methyl, ethyl, benzyl, allyl, or methallyl group; R'', taken individually, is a methyl or ethyl group; R''', taken individually, is a methyl or ethyl group; R'' and R''', taken together, represent divalent, saturated hydrocarbon or ether chains which jointly with the nitrogen form heterocycles; and R', R'', and R''', taken together, represent a trivalent, unsaturated hydrocarbon chain which jointly with the nitrogen atom forms a heterocycle. In the above formula R is a group such as methyl, ethyl, butyl, octyl, dodecyl, or octadecyl or an isomer such as isopropyl, sec.-butyl, 2-ethylbutyl, 2-ethylhexyl, isononyl, and the like. The group R may, therefore, have a straight or a branched chain. X is an anion.

The naphthyl alkyl ethers are converted to the quaternary ammonium methyl form through halomethylation of a naphthyl alkyl ether followed by conversion of the halomethyl group to a quaternary ammonium methyl group. This conversion may be accomplished by reaction with a tertiary amine. Alternatively, the halomethylated ether may be reacted with a secondary amine to form a tertiary amine group which is then alkylated.

In the first step the naphthyl alkyl ethers are halomethylated by reacting them with formaldehyde and a hydrogen halide in excess. Instead of formaldehye itself, there may be used a revertible polymer, such as alpha-trioxymethylene or other compound readily yielding formaldehyde, for example, a formal such as dimethyl formal or diethyl formal. Chloromethyl ether or bromomethyl ether may also be used. The temperature of halomethylation may vary from 0° to 100° C. There may be used an acidic catalyst, such as zinc chloride, sulfuric acid, or chlorosulfonic acid. An inert solvent such as a volatile hydrocarbon or a chlorinated solvent may be used.

Conversion of the halomethylated naphthyl alkyl ether to a quaternary ammonium salt may be effected by reaction with a tertiary amine, directly or in the presence of a solvent. Typical tertiary amines are trimethylamine, triethylamine, allyldimethylamine, methallyldimethylamine, allyldiethylamine, benzyldimethylamine, benzyldiethylamine, pyridine, alpha-picoline, quinoline, N-methylmorpholine, etc.

When the conversion is accomplished through reaction with a secondary amine followed by alkylation, there is used an amine such as morpholine, pyrrolidine, piperidine, dimethylamine, diethylamine, benzyl methylamine, or other quite basic secondary amine. As alkylating agent, there may be used methyl iodide, ethyl bromide, ethyl sulfate, allyl chloride, methallyl bromide, benzyl chloride, benzyl bromide, etc.

After a quaternary salt has been formed, it may be separated by evaporation of a solvent, if used, and purified by crystallization, precipitation, treatment with charcoal, solvent extraction or other conventional procedure.

Typical preparations of the quaternary ammonium salts used in this invention are given in the following examples:

Example 1

A mixture was made from 50 parts by weight of betanaphthyl methyl ether, 20 parts of paraformaldehye, 75 parts of concentrated hydrochloric acid, and 160 parts of carbon tetrachloride. Hydrogen chloride gas was passed for an hour into the mixture without heating. The temperature was then raised by heating the reaction mixture on a water bath. After an hour and a half at water bath temperature, the reaction mixture was cooled to 0° C., filtered, and dried. The solvent was evaporated, leaving a pinkish solid which melted at 122°–4° C. By chlorine analysis this solid contained one chloromethyl group per naphthyl group.

There were mixed 30 parts of this chloromethylnaphthyl methyl ether and 19.6 parts of benzyldimethylamine together with 86 parts of benzene. The mixture was heated for eight hours at 50°–60° C. It was then filtered. The solvent was evaporated to give 40 parts of a colorless, water-soluble solid. Its equivalent weight by ionizable chlorine was 348 (theory for the benzyldimethylamine salt of chloromethyl naphthyl methyl ether is 342).

Instead of the beta-naphthyl methyl ether there may be used in the same way equivalent weights of beta-naphthyl butyl ether, beta-naphthyl octyl ether, beta-naphthyl dodecyl ether, beta-naphthyl octadecyl ether, or other beta-naphthyl alkyl ether to yield the corresponding quaternary ammonium salts.

*Example 2*

Chloromethyl-beta-naphthyl methyl ether was prepared as described in Example 1 and 20 parts by weight mixed with 65 parts of benzene. Thereto was added 13 parts of alpha-picoline. The reaction mixture was heated under reflux for 14 hours, then cooled, filtered, and dried. Solvent was evaporated under reduced pressure and the picoline salt obtained as a cream-colored solid. The equivalent weight thereof was 307 by ionizable chlorine (theory 298).

In place of alpha-picoline the quaternization may be carried out with quinoline, or pyridine, or other tertiary amine.

The naphthyl ethers may be represented by the formula

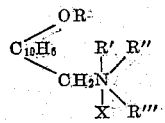

where the symbols have the same significance as before. The compound made in Example 1 has the formula

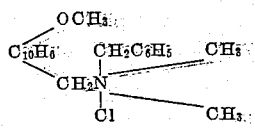

while that of Example 2 has the structure

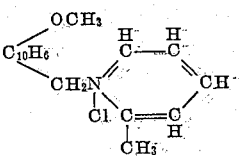

Other quaternary ammonium methyl groups may be used in place of those used for purposes of illustration.

The naphthyl ether reacts at its quaternary ammonium methyl group with cellulose ZOH to form a cellulose ether, thus

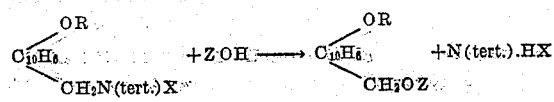

This reaction occurs when the quaternary ammonium compound is heated with a cellulosic compound having free hydroxyl groups. Temperatures of 120° C. to 170° C. are effective.

According to one procedure, cellulose is impregnated with a quaternary ammonium methyl naphthyl alkyl ether. For this purpose, preferably a 5% to 10% solution of such ether is applied to cellulosic fibers, yarns, or fabrics. Both weaker and stronger solutions may be so applied, however, depending upon the color intensity desired, solutions from 1% to saturation being practical for application. Excess solution is removed therefrom, if desired, allowing a retention of 80% to 120% of solution based on the weight of the dry fabric. At this point the fabric may be dried and heated to effect reactions between the ammonium methyl group and cellulose. The modified cellulose may then be treated with a diazonium compound in solution or suspension. Color rapidly develops upon the modified cellulosic fiber, yarn, or fabric. The color body is attached through primary valence bonds directly to the modified cellulose. Excess or unreacted diazonium compound is removed by rinsing.

Alternatively, after the cellulosic material has been treated with a solution of a quaternary ammonium methyl naphthyl alkyl ether, it is treated with a diazonium compound to couple the diazonium compound and naphthyl ether on or in the presence of the cellulosic material. The thus-treated material is then heated at 120° C. to 170° C. to cause the reaction between cellulose and quaternary ammonium methyl group of the coupled ether. The same end result is had as by the first-described method. In either case this invention provides a new way of fixing azo dyes on cellulosic materials.

The concentration of diazonium salts which are used may vary from about 0.1% to 2% or even more. It is generally desirable to supply molecular equivalents of such salts for the naphthyl ether on the cellulosic material. The solutions of diazonium salts are generally used at temperatures of 0° to 20° C., as is common practice, although in those cases where the diazonium salts are fairly stable, higher temperatures can frequently be advantageously utilized up to about 60° C.

The reactions here-described may be applied to cellulose in the form of cotton, linen, ramie, sisal, hemp, regenerated cellulose in the form of rayon, cellulose ethers having free alcoholic-type hydroxyl groups, etc., the cellulose materials being used remaining intact up to at least 170° C.

The invention is illustrated by the following examples:

*Example 3*

There was formed monochloromethylated beta-naphthyl methyl ether and this was reacted with an equivalent amount of benzyldimethylamine. The resulting quaternary ammonium chloride was made into a 10% solution in water. This solution was applied to a viscose rayon fabric and excess solution removed by squeezing between rolls. This treated fabric was dried at 100° C. and heated for 10 minutes at 150° C.

A solution of a diazonium compound was meanwhile prepared. A suspension was made of 18.3 parts by weight of 2,4-dinitroaniline in 142 parts of nitric acid (sp. gr. 1.42) and the suspension cooled below 10° C. There was then added 9.5 parts of sodium metabisulfite. The solution of diazonium salt thus obtained was added to 100 parts of ice and 500 parts of water.

The treated fabric from above was then passed into the diazonium salt solution and left there for two hours. During this time a brownish color developed on the fabric. The cloth was then washed with water and dried. The color was fast to washing.

In place of the dinitrobenzenediazonium salt used above there may be used diazonium salts from 2,5-dichloroaniline, o-nitroaniline, sulfanilic acid, benzidine, beta-naphthylamine, p-aminoacetophenone, or the like. Colors develop on the fabric carrying the methylnaphthyl ether group varying from yellow to brown, the particular color depending primarily upon the diazonium salt selected and applied.

Example 4

The benzyldimethyl quaternary ammonium chloride of methyl-beta-naphthyl methyl ether was applied to a rayon fabric from a 5% solution. Excess solution was removed by centrifuging and the cloth was then passed into a chilled solution of dinitro-benzene diazonium nitrate, prepared as in Example 1 and diluted twentyfold with water. The naphthyl ether and diazonium compound coupled on the cellulose fabric. After the fabric had soaked for an hour in the solution of diazonium salt, it was removed, dried at 100° C. and heated for 10 minutes at 150° C. The cloth was then washed. It was dyed brown. The dyeing was fast to washing with water and soap and to boiling in alcohol.

In place of the beta-naphthyl methyl ether used above there may be used other beta-naphthyl alkyl ethers. With large alkyl groups the same general results are obtained, the time of coupling being desirably increased. It has been found that times of one-half hour to six hours for coupling give good results.

We claim:

1. A process for dyeing cellulosic material having free alcoholic hydroxyl groups which comprises the steps of treating a said material with a solution of a naphthyl ether, subsequently treating said material with a solution of a diazonium salt, and heating the cellulosic material carrying at least said naphthyl ether at 120° to 170° C., said naphthyl ether having the formula

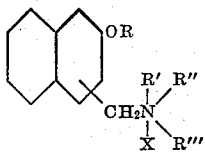

wherein R is an alkyl group of one to eighteen carbon atoms; R', taken individually, is a member of the class consisting of methyl, ethyl, allyl, methallyl, and benzyl groups; R", taken individually, is a member of the class consisting of methyl and ethyl groups; R'", taken individually, is a member of the class consisting of methyl and ethyl groups; R" and R'", taken together, represent a member of the class consisting of divalent saturated hydrocarbon chains of four to five carbon atoms and ether chains which jointly with the nitrogen form a heterocycle; R', R", and R'", taken together, represent a trivalent unsaturated hydrocarbon group which jointly with the nitrogen atom forms a heterocycle; and X is an anion.

2. A process of dyeing cellulosic materials having free alcoholic hydroxyl groups which comprises treating said materials with a solution of a naphthyl ether of the formula

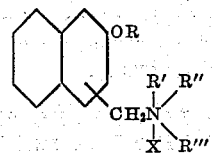

wherein R is an alkyl group of one to eighteen carbon atoms; R', taken individually, is a member of the class consisting of methyl, ethyl, allyl, methallyl, and benzyl groups; R", taken individually, is a member of the class consisting of methyl and ethyl groups; R'", taken individually, is a member of the class consisting of methyl and ethyl groups; R" and R'", taken together, represent a member of the class consisting of divalent saturated hydrocarbon chains of four to five carbon atoms and ether chains which jointly with the nitrogen atom form a heterocycle; R', R", and R'", taken together, represent a trivalent unsaturated hydrocarbon group which jointly with the nitrogen atom forms a heterocycle; and X is an anion, treating said cellulosic materials carrying a said naphthyl ether with a solution of a diazonium salt, and heating the treated cellulosic materials at 120° to 170° C. to react the cellulosic materials and naphthyl ether at the quaternary ammonium methyl group thereof.

3. A process of dyeing a cellulosic material having free alcoholic hydroxyl groups which comprises impregnating said material with a solution of a naphthyl ether of the formula

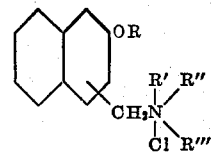

wherein R is an alkyl group of one to eighteen carbon atoms; R', taken individually, is a member of the class consisting of methyl, ethyl, allyl, methallyl, and benzyl groups; R", taken individually, is a member of the class consisting of methyl and ethyl groups; R'", taken individually, is a member of the class consisting of methyl and ethyl groups; R" and R'", taken together, represent a member of the class consisting of divalent saturated hydrocarbon chains of four to five carbon atoms and ether chains which jointly with the nitrogen atom form a heterocycle; R', R", and R'", taken together, represent a trivalent unsaturated hydrocarbon group which jointly with the nitrogen atom forms a heterocycle; heating the resulting impregnated cellulosic material at 120° to 170° C. to react said material with said naphthyl ether, and treating said reacted material with a solution of a diazonium salt.

4. A process of dyeing a cellulosic material having free alcoholic hydroxyl groups which comprises impregnating said material with a solution of a naphthyl ether of the formula

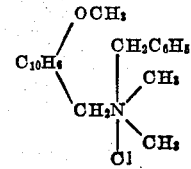

treating said material with a solution of a diazonium salt, and heating said material together with said naphthyl ether at 120° to 170° C. until a reaction has taken place between said cellulosic material and said ether at its quaternary ammonium methyl group.

LOUIS H. BOCK.
    PETER L. DE BENNEVILLE.

REFERENCES CITED

The following references are of record in the file of this patent:

UNITED STATES PATENTS

| Number | Name | Date |
|---|---|---|
| 1,886,480 | Haller | Nov. 8, 1932 |
| 2,123,154 | Schirm | July 5, 1938 |
| 2,136,377 | Dinklage | Nov. 15, 1938 |